ANALOG TO DIGITAL SIGNAL CONVERSION

Filed March 14, 1960 2 Sheets-Sheet 1

INVENTOR.
GERARD CURRIE
BY Edward A. Robinson
ATTORNEY

ANALOG TO DIGITAL SIGNAL CONVERSION

Filed March 14, 1960 2 Sheets-Sheet 2

INVENTOR.
GERARD CURRIE
BY Edward A. Robinson
ATTORNEY 3,145,376

ANALOG TO DIGITAL SIGNAL CONVERSION

Gerard Currie, Santa Clara, Calif., assignor to General Precision, Inc., Binghamton, N.Y., a corporation of Delaware Filed Mar. 14, 1960, Ser. No. 14,874
11 Claims. (Cl. 340—347)

This invention relates to analog and digital electronic computing circuits, and more particularly to such circuits for converting analog signals representative of numerical quantities into digital signals coded to represent the same numerical quantities.

As is generally well-known, there are two basic types of computing circuits—analog and digital. In an analog circuit there is a direct correspondence or an "analogy" between the quantities undergoing calculations and certain electrical quantities, mostly voltages, existing at various points in the circuit. In a digital circuit, items of data are represented by coded combinations of signals in which each signal may exist in one of a finite number (usually only two) of discrete quantities. The circuits of analog and digital computers are quite different from each other, but the need often arises for converting an analog signal in a corresponding digital signal, or vice versa. There have been various circuits devised for analog-to-digital or digital-to-analog signal conversion.

In an electronic computing system a plurality of analog signals may be derived each representing a quantity to be expressed in digital numbers. Although the computing system could be provided with several analog to digital converting circuits, an economy may be effected by providing a single multiplexed analog to digital converting circuit which operates upon the various analog signals on a time sharing basis. The various analog inputs may be applied to an input switching or commutator arrangement such that the various analog signals are impressed in sequence upon a single converter circuit, and corresponding digital output signals are developed in the same time sequence.

Analog to digital conversion may be accomplished by applying the analog signals to the input or summing point of an operational amplifier, and then selectively combining therewith digitally derived voltages to establish a predetermined signal level in the amplifier. For example, the input level of the amplifier may be pre-set to zero or ground potential, and a positive analog voltage must be balanced with an appropriate negative digitally derived voltage to re-establish the input voltage at zero. The circuit for generating the digital balancing voltages may simultaneously develop the digital output signal.

Operational amplifiers are amplifiers which are capable of performing one or more mathematical operations such as summing, integrating or differentiating and are usually of the type capable of amplifying direct currents. This type amplifier may be subject to an error resulting from direct current drift. Amplifier drift may be temporarily corrected by a manual adjustment, but this adjustment will not continue to be correct, as the amplifier remains in operation and therefore an initial adjustment may later become faulty.

In the multiplexed or time sharing analog-to-digital conversion systems, a further error may be introduced because of leakage currents passed by the switching or commutator input circuit. Such leakage currents are individually of slight consequence, however, as more and more analog channels are added to the input circuit, the leakage currents become cumulative in their effect and cannot be ignored. Heretofore, a multiplexed analog-to-digital conversion system has been limited to approximately 30 or 40 separate analog inputs because the combined leakage currents from more input circuits would cause a combined error which could not be tolerated.

It is an object of this invention to provide an improved method and means for converting analog signals into digital signals wherein an error correction arrangement is provided to compensate for both the direct current drift of the amplifier and the switching or commutator leakage of the multiple analog input circuits.

It is a further object of this invention to provide an improved multiplexed analog-to-digital converter with an input switching arrangement and error correction arrangement such that the number of analog input channels may be increased substantially beyond present limitations and more particularly it is an object to provide an improved input switching arrangement for multiplexing many analog inputs on a time sharing basis to a single analog-to-digital signal conversion circuit.

Other objects and many of the attendant advantages of this invention may be readily appreciated as they become better understood by reference to the following detailed description when considered in connection with the accompanying drawings in which.

Figure 1:
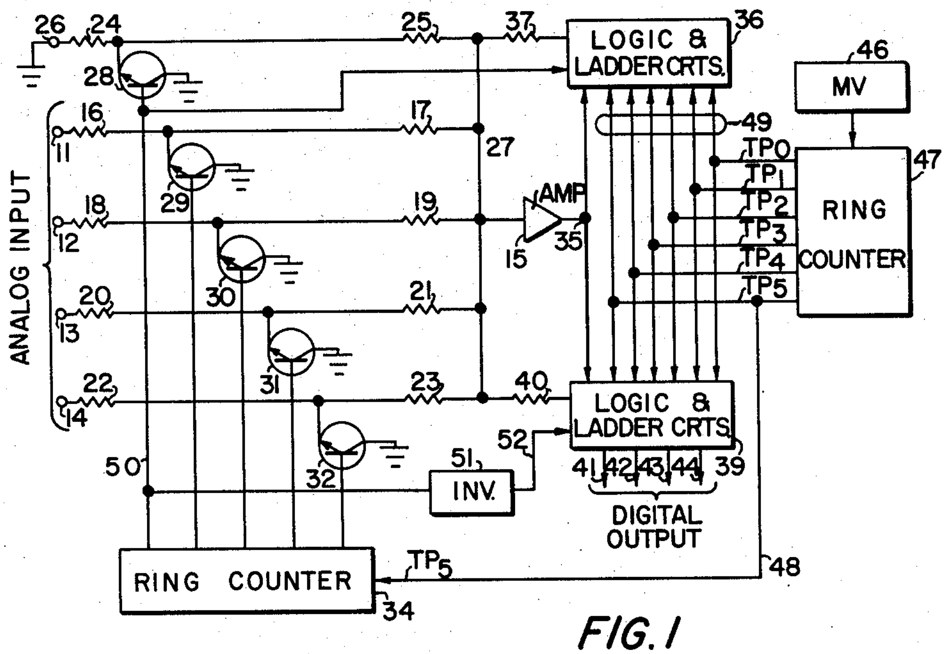
FIGURE 1 is a circuit diagram partially in blocks of the analog to digital signal conversion apparatus of this invention.

Briefly stated, according to a preferred embodiment of this invention, a plurality of analog input signals may be applied to respective input terminals 11, 12, 13 and 14 which are coupled to an operational amplifier 15 through resistive networks including resistors 16 through 23 arranged in pairs as shown in FIGURE 1. A further pair of resistors 24 and 25 is coupled between a reference potential input terminal 26 and the input summing point 27 of the amplifier 15. The reference potential 26 may be that of ground as indicated in FIGURE 1 or alternatively, it may be any desired constant voltage. A plurality of transistors 28 through 32 constitute an input commutator or switching means. When conductive, the transistors shunt the analog signals to ground; and when a selected transistor is non-conductive the corresponding analog signal is coupled to the input of the amplifier 15.

The amplifier 15 may be of conventional design—preferably having a low input impedance and being coupled to pass direct currents. Certain operational amplifiers described in "Electronic Analog Computers" by Korn and Korn, 1956 Edition, pages 214 to 223 would be suitable for use as the amplifier 15 in this invention.

A cycle of operation is initiated when the transistor 28 is rendered non-conductive by a control means such as a ring counter 34, whereupon the reference voltage (ground potential) of the terminal 26 is coupled to the summing point 27 of the amplifier 15 through the resistors 24 and 25. During this interavl the output at a point 35 should likewise remain at zero potential, but due to the inaccuracies and spurious currents from transistors 28 through 32, and due to the drift of the amplifier 15 the potential at the output point 35 may be of a substantial value. During this initial period, a first digital ladder circuit 36 will digitally generate a correction voltage which is passed to the summing point 27 of the amplifier through a resistive coupling 37 and the amplifier signal level is restored to zero (or other reference voltage). As the ring counter 34 is stepped through the remainder of the operating cycle, the transistors 29, 30, 31 and 32 become non-conductive in sequence, whereby the analog inputs of the terminals 11, 12, 13 and 14 are sequentially impressed upon the summing point 27 of the amplifier 15. During the remainder of the cycle, the correction voltage from the ladder 36 remains impressed upon the input of the amplifier 15, and a second digital ladder circuit 39 becomes operative to develop and impress digital voltages upon the amplifier summing point 27 through a coupling resistor 40. Digital output signals are generated to correspond to the voltages impressed upon the amplifying summing point 27 and will appear at terminals 41 through 44.

Thus the transistor 28 controlled by the ring counter 34 serves to impress a reference potential upon the summing point 27 and amplifying circuit 15, and a digital correction voltage is obtained from the ladder circuits 36 representative of error introduced in the amplifying circuit. The transistors 29–32 serve to impress the analog signals on the amplifying circuit 15 and output signals are obtained therefrom which will appear on the lead 35. The ladder circuits 36 continue to supply the error correcting voltage to the summing point 27, and thereby the analog signals are corrected in accordance with the digital correction voltage.

Figure 2:
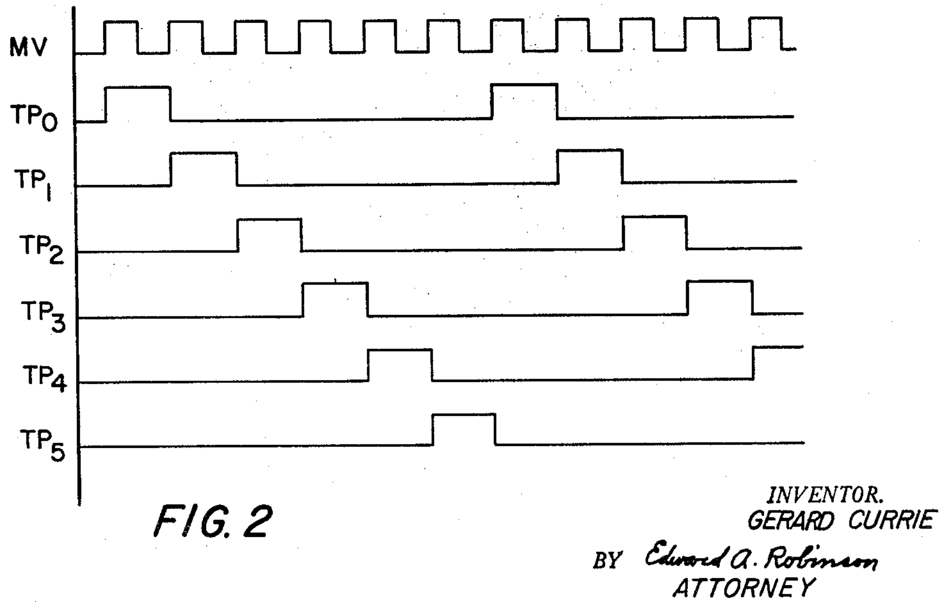
FIGURE 2 is a timing diagram of the timing or clock pulses used by this invention.

The timing cycle may be best understood by reference to FIGURE 2. A multivibrator 46 (FIGURE 1) may be used to generate a square wave as shown by the first curve indicated as MV. This multivibrator may be of conventional design, for example, the circuit shown and described on page 80 and on page 443 of "Digital Computer Components and Circuits" by R. K. Richards, published by D. Van Nostrand Company. This multivibrator 46 may be coupled to a ring counter circuit 47, which may also be of conventional design such as shown in the Richard's book supra on page 89, 447, or 450. The ring counter will produce sub-cycles of sequentially timed pulses at output terminals indicated in FIGURE 1 as $TP_0$, $TP_1$, $TP_2$, $TP_3$, $TP_4$ and $TP_5$. As shown in FIGURE 2 a $TP_0$ pulse may initiate a sub-cycle of operation, and will be followed by a $TP_1$, thence the $TP_2$, $TP_3$, $TP_4$ and $TP_5$ in that sequence. Immediately after a final $TP_5$ pulse an initial pulse $TP_0$ of the next succeeding sub-cycle will appear. As shown in FIGURE 1 the timed pulses are impressed upon the logic and ladder circuits 36 and 39.

The final pulse $TP_5$ from the ring counter circuit 47 is passed via a lead 48 to advance the other ring counter 34, and it may be appreciated that a cycle of operation will commence when the ring counter 34 is set to render the transistor 28 non-conductive thereby impressing the reference potential from the input terminal 26 upon the amplifier input 27. In the next 6 operations of the ring counter 47, constituting a first sub-cycle, pulses are passed over the various leads 49 to the ladder circuits while the ring counter 34 causes the reference potential from the terminal 26 to be applied to the amplifier. At the conclusion of the sub-cycle a $TP_5$ pulse will advance the ring counter 34 cutting off the transistor 29 and thereby causing the analog input from the terminal 11 to be impressed upon the amplifier 15. While this input continues to be impressed upon the amplifier, the ring counter 47 proceeds through another sub-cycle of operation. Obviously, each time the ring counter 47 has completed a full sub-cycle, then the ring counter 34 will be again stepped or advanced to the next position for a similar sub-cycle of operation with the next analog input signal. The ring counter 34 renders non-conductive a selected one of the transistors 28 through 32, and therefore, the ring counter 34 together with the transistors 28–32 constitute a switching means for selecting and impressing a single one of the analog inputs upon the amplifier 15.

As indicated above, the ring counter 34 commences its cycle by applying an appropriate voltage over a lead 50 to the base electrode of the transistor 28. This voltage is also conducted by the lead 50 to the logic and ladder circuits 36 to condition certain AND gates to pass the timed pulses from the counter 47. After the ring counter 34 has advanced past its initial state, the lead 50 will become essentially ground potential, whereupon an inverter circuit 51 will generate and pass an appropriate voltage over a lead 52 to condition other AND gates of the logic circuits 39. Thus, it may be seen that the conditioning of the AND gates of the logic circuits 36 or 39 is determined by the conduction state of the ring counter 34 such that during the initial sub-cycle the gates of the logic circuit 36 are conditioned to receive timing pulses, and during the subsequent sub-cycles the gates of the logic circuit 39 are so conditioned.

Figure 3:
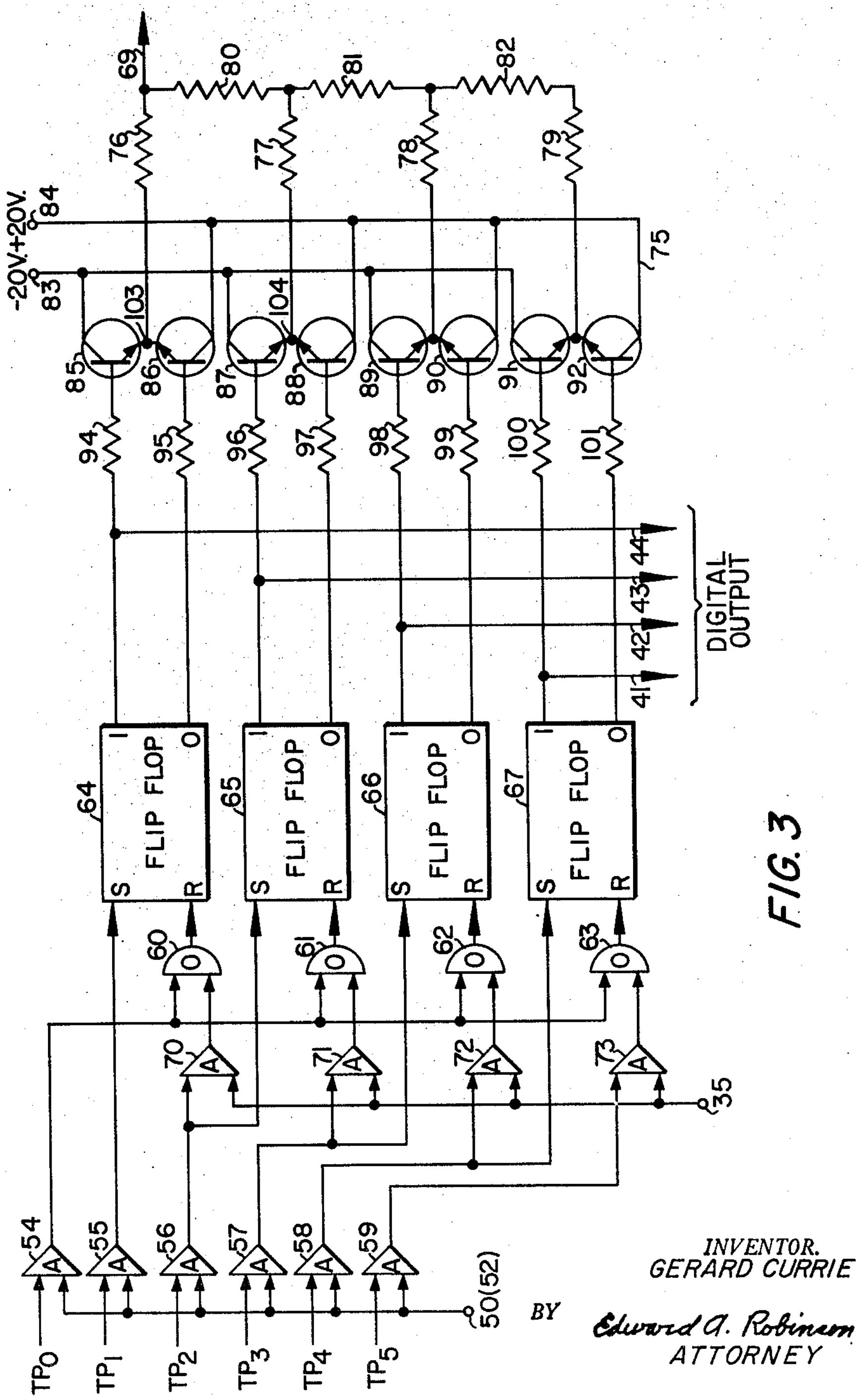
FIGURE 3 is a circuit diagram more fully illustrating the logic and digital ladder circuits which were shown as simple blocks in FIGURE 1.

An understanding of the logic and ladder circuit 36 may be gained by reference to FIGURE 3. When the appropriate conditioning voltage is received on the terminal 50, the timed pulses $TP_0$ through $TP_5$ may pass through the AND gates 54 through 59. These AND gates may be of any conventional type, the Richard's book supra, discloses suitable diode "AND" circuits together with "OR" circuits in Figure 2–1 on page 38.

As was indicated in connection with FIGURE 2 the first timing pulse of a sub-cycle is $TP_0$ which would pass through the conditioned AND circuit 54 and through the "OR" circuits 60 through 63, and will reset the flip-flop circuits 64 through 67. These flip-flop circuits may likewise be of any conventional design as for example the two-triode circuits of Figure 3–3, page 71 or the transistorized circuits of pages 160 and 161 of the Richard's book supra. When the flip-flop circuits are reset by pulses applied to the R terminals (lower left corner as shown in FIGURE 3), the flip flop assumes a first conduction state and may be considered as "off." Thus, it becomes apparent that the $TP_0$ pulse functions to reset or turn "off" all of the flip-flops of the logic circuit.

When the $TP_1$ pulse appears and passes through the conditioned AND gate 55, the flip-flop 64 is set or turned "on" thereby. As will be described subsequently when the flip-flop 64 is "on" the voltage at terminal "1" is high to represent the highest order binary digit and the ladder circuit will generate a voltage corresponding to the highest order of digits. This voltage will appear at the output terminal 69 and will be passed to the summing point 27 of the amplifier 15 through the coupling resistor 37 (see FIGURE 1). The combined voltages from the reference potential point 26 and from the highest order of digits from the ladder 36 are passed by the amplifier 15 and the voltage level of the amplifier output terminal 35 indicates whether the highest order of voltages was too small or too great as compared with the reference potential 26. If the voltage is too great, an AND gate 70 will be conditioned to receive and pass the next timing pulse $TP_2$. In such case the $TP_2$ pulse will pass through the OR circuit 60 to reset the flip-flop 64 and thereby eliminate or reject the highest order voltage. On the other hand, if the highest order voltage were insufficient to properly balance the voltage from the terminal 26, then the AND gate 70 would not be conditioned to pass the $TP_2$ pulse; and as a result the flip-flop 64 would remain "on" and the highest order voltage would not be rejected.

The $TP_2$ pulse therefore functions to selectively reset the flip-flop 64 and thereby to selectively reject the highest order voltage. In addition, the $TP_2$ pulse is passed through the AND gate 56 to set or turn "on" the second flip-flop 65. The flip-flop 65 controls the second order voltage, and therefore, when the first order of voltage is selectively rejected or accepted the second order of voltage will appear either alone or combined with the highest order voltage. As in the first case above, the voltage at the output terminal 35 of the amplifier 15 will either condition or fail to condition the AND circuit, 71, and the next successive timing pulse, $TP_3$, will, therefore, selectively either pass through the AND gate 71 to reset the flip-flop 65 and reject the second order voltage, or will fail to pass that AND gate thereby accepting the voltage. By similar logic we may consider the setting or turning "on" of the subsequent flip-flops 66 and 67 and the selective acceptance or rejection of each digital voltage in a descending order of digits.

At the conclusion of each sub-cycle, the state of the flip-flops 64 through 67 cause the ladder circuit 75 to generate the selected combined voltages which will most closely balance the input voltage from the terminal 26. These voltages are developed by a ladder network comprising resistors 76 through 82. The resistors 76 through 79 are each coupled to positive or negative voltage supplies 83 and 84 by pairs of transistors 85 through 92. Each pair of transistors functions as a single pole, double throw switch such that the resistor connected to the mid point therebetween may be considered as connected either to the negative 20 volts of terminal 83 or the positive 20 volts of terminal 84. The base electrodes of the transistors of each pair are coupled to the corresponding flip-flop circuits 64 through 67 by resistors 94 through 101. Considering the first pair of transistors 85 and 86, we may appreciate that one of the base electrodes is coupled to a high positive voltage while the other is coupled essentially to a zero voltage depending on whether the flip-flop is "on" or "off." Thus, one of the transistors of each pair will be biased into conduction while the other transistor of the pair will be biased into non-conduction. The transistor which conducts will present a very low impedance amounting to a closed switch while the other transistor, which is non-conductive, will present a very high impedance amounting to an open circuit. Therefore, the point 103 connected between the two emitter electrodes of transistors 85 and 86 will be substantially at either a negative 20 volts or a positive 20 volts depending upon the conduction state of the flip-flop 64.

In a particular circuit constructed, the voltages of terminals 83 and 84 were established as plus and minus 20 volts because of considerations which are not a part of this invention. It may be appreciated that different voltage standards can be established and that the transistor pairs and the ladder network will function equally well therewith.

The ladder network 75 comprises the serially connected resistors 80, 81, and 82 which are all equal to each other in resistive value. The resistors 76, 77, 78 and 79 are equal in value to each other but are each equal to twice the resistive values of each of the serially connected resistors 80, 81 and 82. Obviously, the greatest contribution to the current output at the terminal 69 would be made when the flip-flop 64 is "on" such that the transistors 86 conducts and the potential at point 103 becomes substantially 20 volts. Because of the choice of the resistive values, the switching of the next series connection point 104 to the positive 20 volts which contributes only half of the current output which was contributed through the resistor 76. Contributions through the resistors 78 and 79 are likewise related according to the binary numbering system, and therefore the total current output from the ladder circuit corresponds to a binary number which may be derived from those flip-flops which remain "on" after completion of a sub-cycle.

The logic and ladder circuits 39 are substantially the same as the circuits 36 but with slight differences which will be pointed out. The digital output signals from the circuits 39 are developed by the flip-flops 64 through 67 and will appear on the digital output leads 31 through 34 at the end of each sub-cycle of operation and will correspond to the voltage selectively developed by the ladder network 75 and with the particular analog input signal selected by the ring counter 34. FIGURE 3 shows the digital outputs as being derived from the "1" outputs of the flip-flops, but this output may also be taken from the "0" outputs, or from the combined outputs of each flip-flop if this is compatable with the further digital circuits (not shown) which may be coupled to receive the output signals.

At the completion of the initial sub-cycle, the ladder circuit 36 has developed a correction voltage corresponding to the circuit error which may have been introduced by the transistor input 28 through 32 and by the amplifier 15. As described heretofore this digital correction is stored in the flip-flops 64 through 67 on the circuit 36 and causes the correction voltage to be impressed from the summing point of the amplifier 15. These flip-flops 64 through 67 constitute a digital storage means for storing the correction voltage which will continue to be impressed upon the amplifier throughout the remainder of the cycle while the analog voltages are impressed sequentially from the amplifier. Although the ladder circuit 36 continues to impress its correction voltage throughout the whole cycle of operation, the logic and ladder circuits 39 is re-set to zero after a read-out of the digital information at the conclusion of each sub-cycle. At the completion of the final sub-cycle the flip-flops 64 through 67 of the circuits 39 are re-set prior to the commencement of the next full cycle of operation, and particularly the circuits 39 are re-set prior to the initial sub-cycle when the correction voltage is being developed by the circuits 36. Therefore, the voltage developed by the circuits 36 continues to be impressed on the amplifier 15 while the circuits 39 are operative, but the circuits 39 are re-set and develop no voltage while the circuits 36 are operative during the first sub-cycle.

This slight difference in the operation of the logic and ladder circuits 39 may be accomplished by changing the timing pulse connections to circuits 39. The final pulse $TP_5$, of each sub-cycle (excepting the first sub-cycle) may be applied to the AND gate 54 of the circuits 39 to re-set the flip-flops 64 through 67. Then, the first timing pulse $TP_0$ of each sub-cycle will be applied to the AND gate 55 to set or turn "on" the flip-flop 64. During the remainder of each of the sub-cycles, the logic circuits 39 function the same as the circuits 36 described heretofore, except that each timing pulses $TP_0$ through $TP_4$ is shifted to the next successive AND gate 55 through 59. Thus, the sub-cycle is essentially completed by the timing pulse $TP_4$ at which time a digital read-out may be accomplished. The final timing pulse $TP_5$ then resets the circuit 39 to zero in preparation for the next sub-cycle of operation.

For the purpose of simplicity of description and understanding of this invention the number of analog inputs 11, 12, 13 and 14 have been limited to four. However, in the actual practice of this invention further analog inputs may be incorporated into this system by the mere addition of two serially connected resistors and a shunting transistor for each additional input, and by enlarging the ring counter 34 to increase the number pulses in each cycle. When the transistors 29 through 32 conduct, the voltage at the serial connection point between the resistors will drop to substantially ground voltage. Each transistor will contribute a slight error voltage to the input circuit, and although a large number of inputs will produce a substantial error, this invention provides a means for correcting this input error as well as error due to drift of the amplifier. By one of this invention the input and amplifier drift errors are essentially eliminated and no limit is foreseeable to the number of analog inputs that may be applied to such a time sharing, multiplexed conversion circuit. Indeed, this apparatus has been built and successfully tested using a total of one hundred analog inputs. Since each additional input requires a minimum of additional circuitry (two resistors, one transistor and an additional step of the ring counter 34) a substantial economy in manufacture is effected.

To afford a further ease in description and understanding of this invention, the number of flip-flops 64 through 67 has been limited to four, but in actual practice it is desirable to increase this number to obtain a greater accuracy of the digital output signal. The circuit of FIGURE 3 having four flip-flops may produce an error ratio of 1 to 16, and this accuracy could not be tolerated in most computer applications. The apparatus built by this inventor contained 10 flip-flops in each of the digital logic circuits 36 and 39, and therefore, the output error ratio was the ratio of 1 to 1,024 or expressed as percent the apparatus should produce an error of less than 0.1%. Obviously, this apparatus may be designed for any desired accuracy (assuming a corresponding accuracy in the input resistors and amplifier components) by merely providing the correct number of flip-flop circuits and the attending circuitry as indicated in FIGURE 3 together with a corresponding enlargement of the ring counter 47 to yield an increase in the number of clock pulses $TP_0$, $TP_1$, $TP_2$ . . . $TP_n$.

The digital arrangement of circuit 36 for developing a correction voltage and for storing and retaining that correction voltage throughout a cycle of operation provide a greater degree of accuracy than an analog voltage storage arrangement. This digital voltage storage does not depend for accuracy upon the charging of a capacitor, or the like; and therefore, the voltage may be stored for an indefinite period of time without deterioration from leakage currents or such.

While the ladder circuit 75 is considered to be a conventional binary arrangement, it may be appreciated that other forms of digital voltage generation in accordance with a numbering system could be used in this invention. Thus, for example, if a ladder circuit were devised utilizing a decimal logic rather than a binary logic, then this invention could be practiced essentially as shown and described heretofore but could produce a decimal output.

Changes may be made in the form, construction and arrangement of the parts without departing from the spirit of the invention or sacrificing any of its advantages, and the right is hereby reserved to make all such changes as fall fairly within the scope of the following claims.

What is claimed is:

1. Apparatus for converting analog signals representative of numerical quantities into digital signals corresponding to the numerical quantities, said apparatus comprising an input means for receiving and selectively passing the analog signals, a first digital voltage generating means, and a second digital voltage generating means, said input means being initially operable to pass a reference voltage, said first digital voltage generating means being operable to develop and digitally store a correction voltage when the reference voltage is passed by the input means, said second digital voltage generating means being operable to develop a voltage when a selected analog signal is passed by the input means, said second digital voltage generating means being further operable to develop a digital output signal corresponding to the voltage developed thereby.

2. Apparatus for converting analog signals representative of numerical quantities into digital signals corresponding to the numerical quantities, said apparatus comprising an input switch means for receiving and selectively passing the analog signals, a first digital ladder circuit for generating a voltage, said input switching means being initially operable to pass a reference voltage and said digital ladder circuit being operable to develop a correction voltage when the reference voltage is passed by the input switching means, a second digital ladder circuit operable to generate a voltage corresponding to the selected analog signal and further operable to generate a digital output signal corresponding to the voltage thereby generated.

3. Apparatus for converting analog signals representative of numerical quantities into digital signals corresponding to the numerical quantities, said apparatus comprising an input switching means for receiving and selectively passing the analog signals, a circuit means coupled to the input switching means, a first digital voltage generating means for generating voltage in accordance with a digital numbering system, said switching means being initially operable to impress a reference potential upon the circuit means, said first digital voltage generating means being responsively coupled to the circuit means and being operable to develop a correction voltage corresponding to the reference potential, means for coupling the correction voltage to the circuit means, and a second digital voltage generating means for generating successive voltages in accordance with the digital numbering system, said input switching means being operable to impress the analog signals upon the circuit means, and said second voltage generating means being responsive to the circuit means and being operable to establish a digital output and a voltage corresponding to the analog signal.

4. Apparatus for converting analog signals representative of numerical quantities into digital signals corresponding to the numerical quantities, said apparatus comprising an input switching means for receiving and selectively passing the analog signals, an amplifying circuit coupled to the input switching means, a first ladder circuit for generating successive voltages corresponding to a digital numbering system, said input switching means being initially operable to pass a reference voltage to the amplifying circuit and said first ladder circuit being operable to generate and selectively reject the digital voltages to develop a correction voltage corresponding to an error resulting from the input switching means and the amplifying circuit, said input switching means being subsequently operable to selectively pass the analog signals to the amplifying circuit, a second ladder circuit operable to generate voltages in accordance with the digital numbering system, said second ladder circuit being further operable to selectively reject the voltages generated to develop the voltage corresponding to the selected analog signal and to generate a digital output signal in accordance with the voltage thereby developed.

5. Apparatus for converting analog signals representative of numerical quantities into digital signals corresponding to the numerical quantities, said apparatus comprising an input switching means for receiving and selectively passing the analog signals, an amplifying circuit having an input summing point coupled to the input switching means, said input switching means being initially operable to pass a reference voltage to the summing point of the amplifying circuit and being subsequently operable to sequentially pass the analog signals thereto, a first ladder circuit coupled to the summing point of the amplifying circuit, said first ladder circuit being operable to generate successive voltages having a binary relationship with each other, a means associated with the first ladder circuit and responsive to signals from the amplifier for selectively rejecting the binary voltages whereby the first ladder circuit will develop a correction voltage corresponding to a degree of error resulting from the input switching means and from the amplifier, and a second ladder circuit for generaiting successive voltages having a binary relationship with each other, said second ladder circuit being coupled to the summing point of the amplifier whereby the successive binary voltages are summed with the analog signals from the input switching means and with the correction voltage from the first ladder circuit, said second ladder circuit having means associated therewith for selectively rejecting voltages which exceed the analog signal and for developing a binary output signal.

6. Apparatus for converting analog signals representative of numerical quantities into digital signals corresponding to the quantities, said apparatus comprising an input switching means for receiving and selectively passing the analog signals, said input switching means including a plurality of impedance devices for receiving the analog signals, a controllable conduction device coupled between the impedance device and a source of reference potential for providing a shunt path for the analog signals, an amplifier having an input circuit with a summing point, each of the impedance devices and the controllable conduction device of the input switching means being coupled to the summing point of the amplifier whereby the analog signals may be selectively coupled to or by-passed from the amplifier, a digital means for developing a voltage coupled to the summing point of the amplifier, said input switching means having one impedance device initially operable to pass a reference voltage to the summing point of the amplifier, and said first digital voltage generating means being operable to correct any error introduced by the input switching means and the amplifier.

7. Apparatus for converting analog signals representative of numerical quantities into digital signals corresponding to the quantities, said apparatus comprising an input switching means, an amplifier having an input summing point, and a digital ladder circuit coupled to the summing point of the amplifier, said input switching means including a plurality of impedance paths for passing the analog signals to the summing point of the amplifier, and a plurality of controllable conduction devices for selectively by-passing the analog signals away from the summing point of the amplifier, one of the impedance paths of the input switching means being coupled to impress a reference potential upon the summing point of the amplifier, and one of the controllable conductive devices being operable to permit the reference voltage to pass to the amplifier at the beginning of a cycle of operation, said digital ladder circuit being operable to develop a correction voltage and impress said correction voltage upon the summing point of the amplifier in response to the reference potential thereupon.

8. Apparatus for converting analog signals representative of numerical quantities into digital signals corresponding to the quantities, said apparatus comprising an input switching means, an amplifier having an input summing point, and a first digital ladder circuit and a second digital ladder circuit both coupled to the summing point of the amplifier, said input switching means including a plurality of impedance coupling devices each operable to pass a corresponding one of the analog signals to the summing point of the amplifier, a controllable conduction device coupled to each of the impedance coupling devices for selectively disabling the impedance coupling devices and blocking the analog signal from the summing point of the amplifier, a stepping circuit coupled to the controllable conduction devices and operable to render the devices non-conductive in a pre-determined order, a first order impedance coupling device being coupled to pass a reference potential to the summing point of the amplifier, the stepping circuit being operable to initially select and impress the reference potential upon the amplifier and to subsequently select signals for application to the amplifier, the first digital ladder circuit being operable to provide a correction voltage to the amplifier, and the second digital ladder circuit being operable to provide digital output signals in accordance with the selected analog signal.

9. Apparatus for converting analog signals representative of numerical quantities into digital signals corresponding to the quantities, said apparatus comprising an input switching means, an amplifier having an input summing point, and a first digital ladder circuit and a second digital ladder circuit both coupled to the summing point of the amplifier, said input switching means including a plurality of impedance coupling devices each operable to pass a corresponding one of the analog signals to the summing point of the amplifier, a controllable conduction device coupled to each of the impedance coupling devices for selectively disabling the impedance coupling devices and blocking the analog signal from the summing point of the amplifier, a digital counter circuit coupled to each of the controllable conduction devices and operable to render non-conductive the controllable conduction devices in a sequential order, a first of the impedance coupling devices being coupled to a point of reference potential whereby the reference potential is impressed upon the summing point of the amplifier to initiate a cycle of operation, the first digital ladder circuit being responsive to signals from the amplifier and being operable to develop a correction voltage at the summing point to correct any error resulting from the input switching means and the amplifier, the second digital ladder circuit being responsive to signals from the amplifier and being operable to impress a voltage in accordance with a digital numbering system upon the summing point and being further operable to develop a digital output signal in accordance with the voltage impressed upon the summing point of the amplifier.

10. Apparatus for converting analog signals representative of numerical quantities into digital signals corresponding to the quantities, said apparatus comprising an input switching means, an amplifier having an input summing point, and a first digital ladder circuit and a second digital ladder circuit both coupled to the summing point of the amplifier, said input switching means including a plurality of resistive networks each operable to pass a corresponding one of the analog signals to the summing point of the amplifier, a transistor coupled to each of the resistive networks whereby the analog signals may be by-passed to ground through conduction of the transistor, a ring counter circuit controllably coupled to the transistors and operable to drive all but a selected one of the transistors into conduction, a first of the resistive networks being coupled to a point of reference potential whereby the reference potential is impressed upon the summing point of the amplifier to initiate a cycle of operation, the first digital ladder circuit being operable during the time when the reference potential is applied to the amplifier for developing a voltage to correct any errors which may be introduced into the circuit by the input switching means and by the amplifier and being further operable during the remainder of the cycle to continue to impress the correction voltage upon the amplifier, said second digital ladder circuit being responsive to signals from the amplifier and being operable to impress a voltage in accordance with a digital numbering system upon the summing point and being further operable to develop a digital output signal in accordance with the voltage thereby impressed upon the summing point.

11. The apparatus according to claim 10 and further comprising a means coupling the ring counter circuit to the first and second digital ladder circuits, said coupling means being operable to render the first ladder circuit operative during the time when the first of the resistive networks impresses the reference potential upon the summing point of the amplifier, said coupling means being further operable to render the second digital ladder circuit operative during the remainder of the cycle of operation when the reference potential is not impressed upon the summing point of the amplifier.

References Cited in the file of this patent

UNITED STATES PATENTS

| | | |
|---|---|---|
| 2,945,220 | Lesti et al. | July 12, 1960 |
| 2,947,971 | Glauberman | Aug. 2, 1960 |
| 2,965,891 | Martin | Dec. 20, 1960 |
| 3,027,079 | Fletcher et al. | Mar. 27, 1962 |
| 3,070,786 | MacIntyre | Dec. 25, 1962 |

OTHER REFERENCES

Slaughter: "Time Shared Amplifier Stabilizes Computers," Electronics, April 1954, (pp. 188–190).